(12) United States Patent
Stewart et al.

(10) Patent No.: US 11,904,647 B2
(45) Date of Patent: Feb. 20, 2024

(54) VEHICLE SUSPENSION DAMPER INCLUDING FLOATING PISTON

(71) Applicant: DRiV Automotive Inc., Lake Forest, IL (US)

(72) Inventors: Corey L. Stewart, Monroe, MI (US); Garl Gordon, Lake Forest, IL (US)

(73) Assignee: DRIV Automotive Inc., Northville, MI (US)

( * ) Notice: Subject to any disclaimer, the term of this patent is extended or adjusted under 35 U.S.C. 154(b) by 116 days.

(21) Appl. No.: 17/541,963

(22) Filed: Dec. 3, 2021

(65) Prior Publication Data
US 2023/0173865 A1  Jun. 8, 2023

(51) Int. Cl.
*F16F 9/06* (2006.01)
*B60G 13/08* (2006.01)
*B60G 17/08* (2006.01)

(52) U.S. Cl.
CPC ........... *B60G 13/08* (2013.01); *B60G 17/08* (2013.01); *B60G 2202/24* (2013.01); *B60G 2206/41* (2013.01); *B60G 2500/104* (2013.01); *B60G 2600/21* (2013.01); *B60G 2800/162* (2013.01)

(58) Field of Classification Search
CPC .... B60G 13/08; B60G 17/08; B60G 2202/24; B60G 2206/41; B60G 2500/104; B60G 2600/21; B60G 2800/162
USPC ............................... 188/320, 322.18, 322.22
See application file for complete search history.

(56) References Cited

U.S. PATENT DOCUMENTS

| 2,364,823 | A | * | 12/1944 | Schnell | F16F 9/486 92/185 |
| 2,928,507 | A | * | 3/1960 | Thompson | F16F 9/50 188/320 |
| 3,788,627 | A | | 1/1974 | Wieland | |
| 3,955,807 | A | | 5/1976 | Takahashi et al. | |
| 4,178,002 | A | * | 12/1979 | Kayser | F16F 9/368 188/322.18 |
| 4,821,983 | A | | 4/1989 | Aubrey et al. | |

(Continued)

FOREIGN PATENT DOCUMENTS

| DE | 1926000 A1 | 11/1969 |
| DE | 102016102473 A1 | 8/2017 |

(Continued)

OTHER PUBLICATIONS

International Search Report and Written Opinion dated May 2, 2023 regarding International Application No. PCT/US2022/080810 (11 pages).

*Primary Examiner* — Christopher P Schwartz
(74) *Attorney, Agent, or Firm* — DRiV Aumotive Inc.

(57) ABSTRACT

A shock for a vehicle includes a tube elongated along an axis. A piston is disposed in the tube and is moveable relative to the tube along the axis. A rod is connected to the piston. A floating piston is spaced from the piston along the axis and is moveable relative to the tube along the axis. The tube defines a working chamber between the piston and the floating piston. The tube defines a gas chamber. The floating piston separates the gas chamber from the working chamber. The floating piston has a housing slideably engaged with the tube and a membrane fluidly separating the working chamber from the gas chamber. The membrane is flexible relative to the housing.

17 Claims, 6 Drawing Sheets

(56) References Cited

U.S. PATENT DOCUMENTS

| | | | |
|---|---|---|---|
| 5,848,677 A * | 12/1998 | Beck | F16F 9/367 |
| | | | 188/322.22 |
| 7,464,799 B2 | 12/2008 | Kojima et al. | |
| 9,291,231 B2 | 3/2016 | Kim et al. | |
| 9,353,821 B2 | 5/2016 | Lun | |
| 9,726,251 B2 * | 8/2017 | Nagasawa | F16F 13/08 |
| 10,995,815 B2 | 5/2021 | Van De Plas et al. | |
| 2011/0120822 A1 * | 5/2011 | Kondou | F16F 9/065 |
| | | | 188/269 |

FOREIGN PATENT DOCUMENTS

| | | | |
|---|---|---|---|
| FR | 2306377 A1 | 10/1976 |
| GB | 726898 A | 3/1955 |
| JP | S57192645 A | 11/1982 |

* cited by examiner

VEHICLE SUSPENSION DAMPER INCLUDING FLOATING PISTON

BACKGROUND

A vehicle suspension damper is a component of a vehicle suspension system, e.g., on a passenger automobile, cargo transport truck, etc. The vehicle suspension damper absorbs and damps suspension impulses resulting from driving on uneven surfaces. Example types of vehicle suspension dampers include vehicle shocks (including twin tube, monotube, etc.) and vehicle struts. The vehicle suspension damper is typically used in conjunction with other components of the suspension systems to control movement of wheels of the vehicle relative to a body of the vehicle. In order to control movement, the vehicle suspension damper is between the sprung (body) and the unsprung (suspension/drivetrain) masses of the vehicle.

The vehicle suspension damper includes a tube elongated along an axis, a piston slideably disposed in the tube, and a rod connected to the piston. When the vehicle is driven, suspension impulses drive the rod and piston relative to the tube, which absorbs and damps the suspension impulses. The piston, for example, may divide the tube into a working chamber and a rebound chamber and may dampen suspension impulses by limiting fluid flow past the piston between the working chamber and the rebound chamber and the rod and piston are driven relative to the tube. For example, the piston may have passages that selectively connect the working chamber and the rebound chamber when the piston moves relative to the tube. The tube may include a working fluid, e.g., oil such as hydraulic fluid, in the working chamber and the rebound chamber.

The vehicle suspension damper may include a floating piston slideably disposed in the tube spaced from the piston. The floating piston separates the working chamber from a gas chamber, and thus separates the working fluid from gas in the gas chamber. Compression movement of the piston relative to the tube applies increased pressure to the working fluid, which acts on the floating piston to push the floating piston into the gas chamber to pressurize the gas in the gas chamber. During rebound movement of the piston, the pressurized gas chamber moves the floating piston back toward the piston in rebound.

Friction between the floating piston and the tube during movement of the floating piston relative to the tube reduces ride comfort. During initial compression in the working chamber, this friction initially resists movement of the floating piston to compress the gas chamber. This can undesirably result in a step, or digital, characteristic in vehicle roll performance.

DETAILED DESCRIPTION

With reference to the Figures, wherein like numerals indicate like parts throughout the several views, a shock 12 for a vehicle 10 includes a tube 14 elongated along an axis A. A piston 16 is disposed in the tube 14 and is moveable relative to the tube 14 along the axis A. A rod 18 is connected to the piston 16. A floating piston 20 is spaced from the piston 16 along the axis A and is moveable relative to the tube 14 along the axis A. The tube 14 defines a working chamber 22 between the piston 16 and the floating piston 20. The tube 14 defines a gas chamber 24. The floating piston 20 separates the gas chamber 24 from the working chamber 22. The floating piston 20 has a housing 26 slideably engaged with the tube 14 and a membrane 28 fluidly separating the working chamber 22 from the gas chamber 24. The membrane 28 is flexible relative to the housing 26.

Specifically, in the example shown in the figures, the floating piston 20 has an upper cage 30 defining an upper chamber 32 and a lower cage 34 spaced from the upper cage 30 and defining a lower chamber 36. The floating piston 20 has a membrane 28 fluidly separating the upper chamber 32 and the lower chamber 36. The upper cage 30 has a passageway 38 extending from the upper chamber 32 to the working chamber 22 and lower cage 34 has a passageway 40 extending from the lower chamber 36 to the gas chamber 24.

The vehicle suspension damper 12 absorbs and damps suspension impulses resulting from driving on uneven surfaces. Specifically, when the vehicle 10 is not moving, the piston 16 and rod 18 are at a rest position along the axis A of the tube 14 and the floating piston 20 is at a rest position along the axis A of the tube 14. Impulses during driving of the vehicle 10 move the rod 18 and piston 16 from the rest position in a compression direction C and the rod 18 and piston 16 subsequently move in a rebound direction R toward the rest position. Specifically, movement of the piston 16 in the compression direction C increases pressure in the working chamber 22. A sufficient pressure increase in the working chamber 22 moves the floating piston 20 along the axis A away from the piston 16 and increases pressure in the gas chamber 24. Subsequent movement of the piston 16 in the rebound decreases pressure in the working chamber 22 and the pressure in the gas chamber 24 moves the floating piston 20 toward the rest position. Since the membrane 28 fluidly separates the working chamber 22 from the gas chamber 24 and is flexible relative to the housing 26, the membrane 28 flexes toward the gas chamber 24 during initial movement of the piston 16 from the rest position in the compression direction C.

For relatively small suspension impulses, i.e., small-amplitude displacement of the rod 18 along the axis A, increase in pressure in the working chamber 22 is sufficient to flex the membrane 28 toward the gas chamber 24 and insufficient to move the floating piston 20 toward the gas chamber 24. In other words, the membrane 28 dampens relatively small suspension impulses without movement of the floating piston 20 along the axis A. For relatively small suspension impulses, i.e., small-amplitude displacement of the rod 18 along the axis A, increase in pressure in the working chamber 22 is sufficient to flex the membrane 28 toward the gas chamber 24 and insufficient to move the floating piston 20 toward the gas chamber 24. In other words, the membrane 28 dampens relatively small suspension impulses. In such an example, the membrane 28 eliminates friction from the floating piston 20. For relatively larger impulses, the increase in pressure in the working chamber 22 flexes the membrane 28 and then moves the floating piston 20 toward the gas chamber 24. In such an example, the initial flex of the membrane 28 rounds out the friction peak force from the floating piston 20. In other words, the flex of the membrane 28 eases the increased pressure in the working chamber 22 into motion of the floating piston 20 against the counteracting gas chamber 24.

Figure 1:
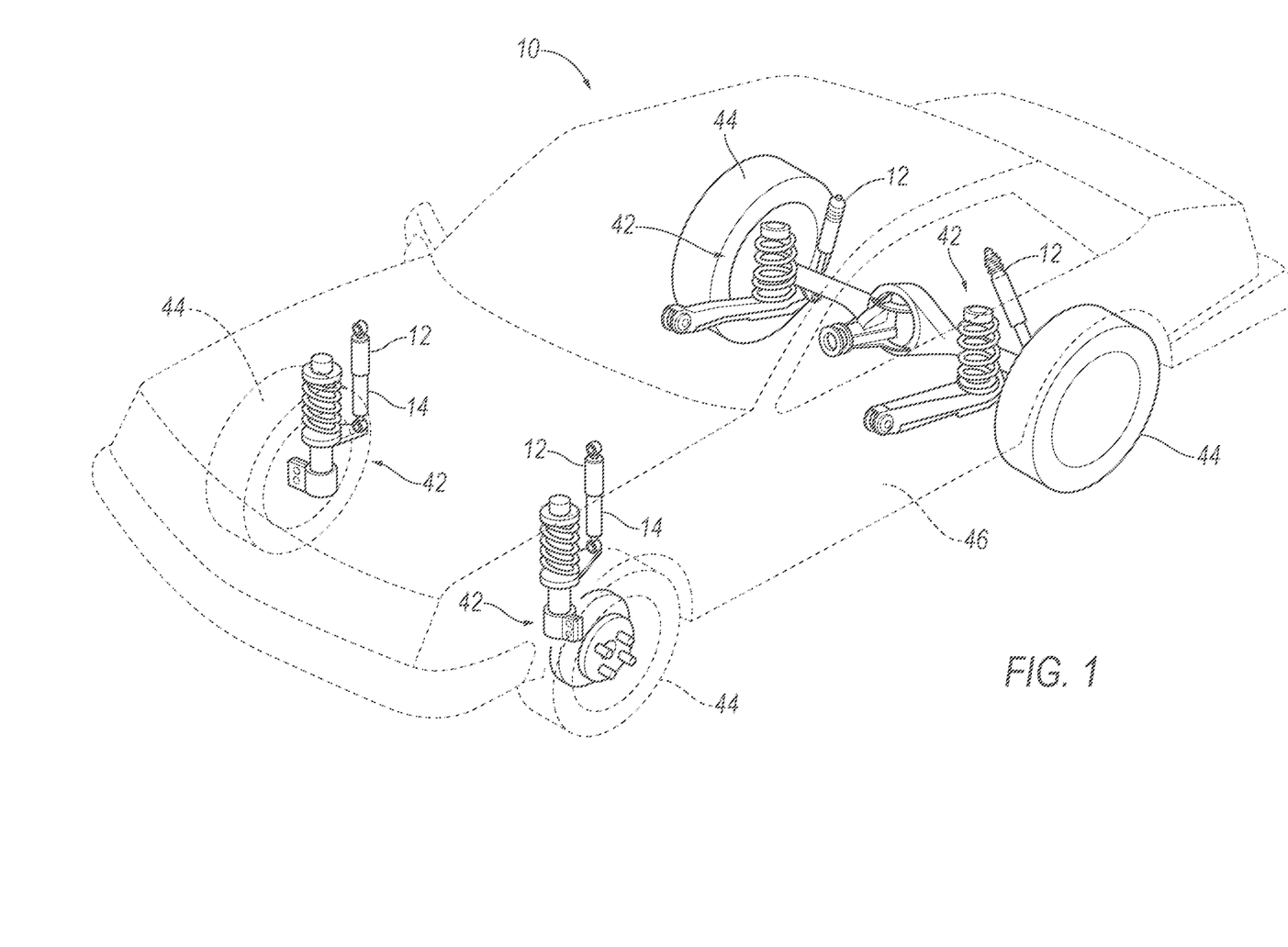
FIG. 1 is a perspective view of a vehicle including shocks.
Figure 2:
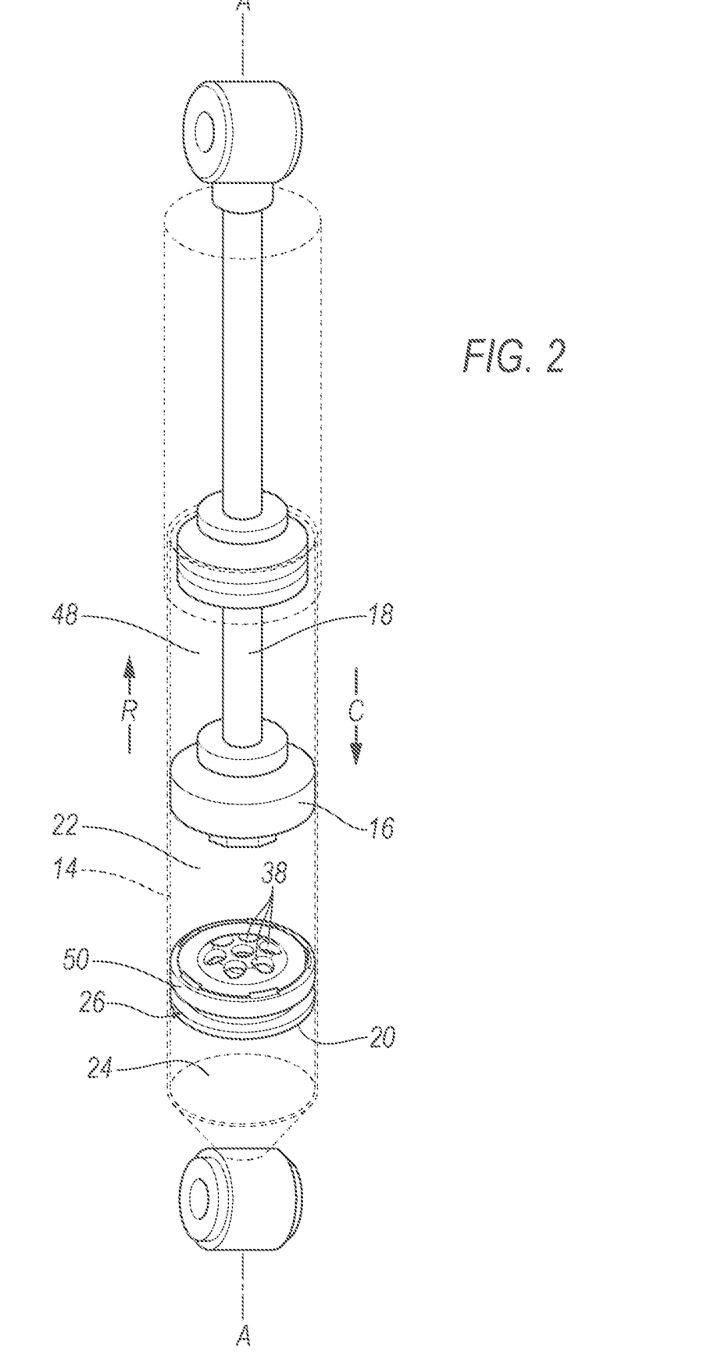
FIG. 2 is a perspective view of one of the shocks.
Figure 3:
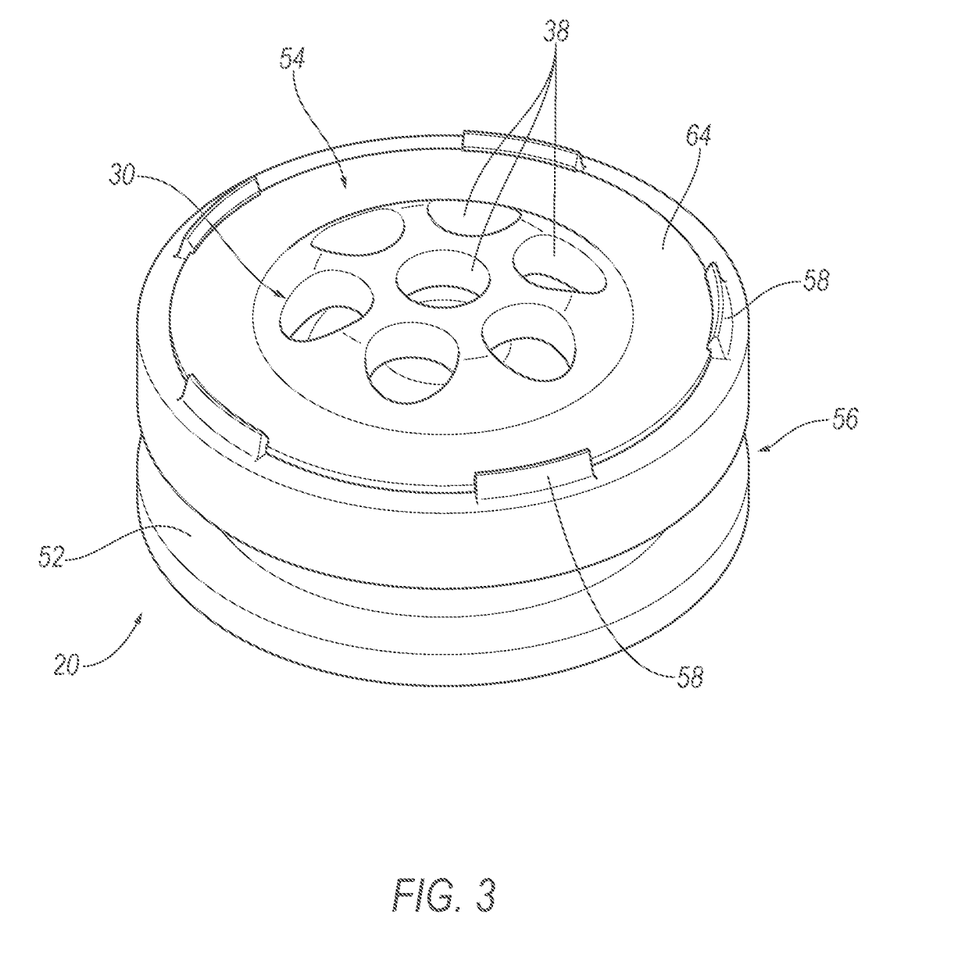
FIG. 3 is a perspective view of a floating piston of the shock.

The vehicle 10, shown in FIG. 1, may be any type of passenger or commercial vehicle such as a car, a truck, a sport utility vehicle, a crossover vehicle, a van, a minivan, a taxi, a bus, etc. With reference to FIGS. 1 and 2, the vehicle 10 includes a suspension system 42 that controls motion of wheels 44 of the vehicle 10 relative to a body and/or frame of the vehicle 10 (hereinafter referred to as "body/frame 46"). The suspension system 42 provides variable force to resist motion of the wheels 44 relative to the body/frame 46 based on a speed and direction of such motion. The suspension system 42 may be of any suitable type, e.g., an independent suspension (as shown at the front of the vehicle 10 in FIG. 1) or a dependent suspension such as a torsion beam (as shown in the rear of the vehicle 10 in FIG. 1), a live axle, etc.

The suspension system 42 includes the shock 12. The shock 12 is elongated along an axis A between end so the shock 12. The shock 12 is at the rest position when the vehicle 10 is not moving and is movable from the rest position to a compressed position (i.e., from movement of the piston 16 in the compression direction C) and to an extended position. A distance between the ends of the shock 12 is less in the compressed position than in the extended position. Springs of the suspension system 42 urge the shock 12 toward the rest position. Force applied to the wheel 44 of the vehicle 10, e.g., from bumps, potholes, etc., urge to shock 12 toward the compressed position.

The shock 12 provides resistance to motion, i.e., resistance to moving toward the compressed position and the extended position. This resistance may be variable as a function of a speed of such motion. Specifically, one end of the shock 12 is connected to the body/frame 46 of the vehicle 10 (and may be fixed relative to the body/frame 46) and the other end of the frame is connected to the wheel 44 (and may be fixed relative to wheel 44, i.e., move with the wheel 44 as the wheel 44 moves relative to the body/frame 46). During travel of the vehicle 10, suspension impulses that move the vehicle 10 upwardly moves the shock 12 in the compression direction C toward a compressed position.

The vehicle suspension damper 12 includes the tube 14, which is elongated along the axis A. The tube 14 is hollow and tubular. With reference to FIG. 2, the tube 14 defines a chamber that is divided into the working chamber 22, the gas chamber 24, and a rebound chamber 48. Specifically, the piston 16 separates the working chamber 22 from the rebound chamber 48 and the floating piston 20 separates the working chamber 22 from the gas chamber 24. The tube 14 defines the working chamber 22 between the piston 16 and the floating piston The tube 14 defines a gas chamber 24 between one end of the tube 14 and the floating piston In such an example, that end of the tube 14 may be closed such that the gas chamber 24 is defined between that end of the tube 14 and the floating piston 20. The floating piston 20 separates the gas chamber 24 from the working chamber 22. Gas in the gas chamber may be any suitable gas such as air, nitrogen, etc.

The tube 14 may be metal, or any suitable material. The working chamber 22 and the rebound chamber 48 may be filled with a fluid, e.g., an oil, such as a hydraulic fluid, e.g., an incompressible hydraulic fluid.

A portion of the rod 18 is disposed in the tube 14 and a portion of the rod 18 extends from the tube 14. The rod 18 is movable relative to the tube 14. Specifically, the rod 18 moves relative to the tube 14 when the shock 12 is moved toward a compressed position or an extended position. The rod 18 may be elongated along the axis A of the shock 12. The rod 18 maybe, for example, metal or any suitable material.

The rod 18 is connected to the piston 16 in the chamber of the tube 14. The rod 18 extends out of the chamber of the tube 14. For example, the tube 14 may have an opening at one end of the tube 14, and the rod 18 may extend from within the chamber to outside the chamber through the opening at the end.

The piston 16 is disposed in the chamber of the tube 14 and is moveable relative to the tube 14 along the axis A. The piston 16 is supported by the rod 18. The piston 16 and rod 18 move relative to the tube 14. For example, the piston 16 may include a center opening (not numbered) and the rod 18 may extend through the center opening and fixed to the rod 18, e.g., via a fastener 160, weld, friction fit, etc. The piston 16 may be metal, plastic, or any suitable material.

The piston 16 divides the chamber into the working chamber 22 on one side of the piston 16 and the working chamber 22 on the other side of the chamber. Movement of the piston 16 within the chamber varies volumes of the working chamber 22 and the rebound chamber 48. For example, movement of the piston 16 when the shock 12 is moved toward the compressed position decreases the volume of the working chamber 22 and increases the volume of the rebound chamber 48. Likewise, movement of the piston 16 when the shock 12 is moved toward the extended position increases the volume of the working chamber 22 and decreases the volume of the rebound chamber 48.

The piston 16 may be sealed to an interior surface of the tube 14, e.g., with a seal (not shown) that may be polymeric and/or metal. Varying the volumes of the working chamber 22 and the rebound chamber 48 generates a pressure differential therebetween and may cause the fluid in the chamber to flow from one side of the piston 16 to the opposite side of the piston 16, i.e., from the working chamber 22 to the rebound chamber 48, or vice versa. For example, the piston 16 may include one or more passages (not numbered) between the working chamber 22 and the rebound chamber 48 to allow fluid flow therethrough. The piston 16 may include components to control fluid flow through the passages, e.g., restriction discs, blowoff discs, etc. In addition or in the alternative to the passages in the piston 16, the shock 12 may include a reserve tube (not shown) sealed to the tube 14 outside of the chamber defining a reserve chamber with passages extending through the tube 14 from the working chamber 22 to the reserve chamber and from the rebound chamber 48 to the reserve chamber. In such an example, the fluid flows through the reserve chamber between the working chamber 22 and the rebound chamber 48 during movement of the piston 16 relative to the tube 14 along the axis A. In such an example, the shock 12 may include components, such as valves, to control fluid flow through the reserve chamber.

With reference to FIG. 2, the floating piston 20 is spaced from the piston 16 along the axis A and is moveable relative to the tube 14 along the axis A. As set forth above, the floating piston 20 separates the working chamber 22 from the gas chamber 24. Movement of the piston 16 in the compression direction C increases pressure in the working chamber 22, which biases the floating piston 20 toward the gas chamber 24. If the pressure in the working chamber 22 exceeds a threshold, i.e., the pressure in the working chamber 22 overcomes the counteracting pressure of the gas in the gas chamber 24, the floating piston 20 moves toward the gas chamber 24 to compress the gas in the gas chamber 24. As described herein, movement of the membrane 28 toward the gas chamber 24 precedes the movement of the floating piston 20. When the gas chamber 24 is compressed, movement of the piston 16 in the rebound direction R the pressure in the working chamber 22 decreases and the pressure in the gas chamber 24 overcomes the counteracting pressure of the fluid in the working chamber 22 so that the floating piston 20 moves away from the gas chamber 24. The floating piston 20 may be sealed to an interior surface of the tube 14, e.g., with a seal 50 (FIG. 2) that may be polymeric and/or metal. The housing 26 of the floating piston 20, e.g., the lower segment 56 of the floating piston 20, may define a groove 52 that receives the seal 50.

With reference to FIGS. 3-6, the floating piston 20 has the housing 26 and the membrane 28. The housing 26 is slideably engaged with the tube 14 and supports the membrane 28. The housing 26 and the membrane 28 fluidly separate the working chamber 22 from the gas chamber 24. Specifically, the housing 26 and the membrane 28 prevent communication between the fluid in the working chamber 22 and the gas in the gas chamber 24.

The housing 26 includes an upper segment 54 and a lower segment 56. The upper segment 54 and the lower segment 56 are engaged with each other and move together as a unit as the housing 26 moves relative to the tube 14 along the axis A. For example, one of the upper segment 54 and the lower segment 56 include retention fingers 58 that engage the other of the upper segment 54 and the lower segment 56. In the example shown in the figures, the lower segment 56 includes the retention fingers 58. In that example, the retention fingers 58 are elastically displaceable by the upper segment 54. Specifically, to assemble the upper segment 54 to the lower segment 56 (with the membrane 28 disposed therebetween), the upper segment 54 is pressed against the retention fingers 58 to displace the retention fingers 58, i.e., radially outwardly from a central axis of the housing 26 (the central axis of the housing 26 is on the axis A when the piston 16 is in the tube 14. When the upper segment 54 moves past the retention fingers 58, the retention fingers 58 return to their previous position to seat the upper segment 54 on the lower segment 56. The retention fingers 58 include locking surfaces 60 to lock the upper segment 54 to the lower segment 56 and may include ramped surfaces 62 to aid in the elastic displacement of the retention fingers 58 during assembly of the upper segment 54. As another example, the lower segment 56 may include an annular slot that receives a snap ring that retains the upper segment 54 to the lower segment 56. Alternatively, the upper segment 54 and the lower segment 56 may be fixed to each other in any suitable fashion. The housing 26, specifically the upper segment 54 and the lower segment 56, may be plastic, metal, or any other suitable material.

Figure 4:
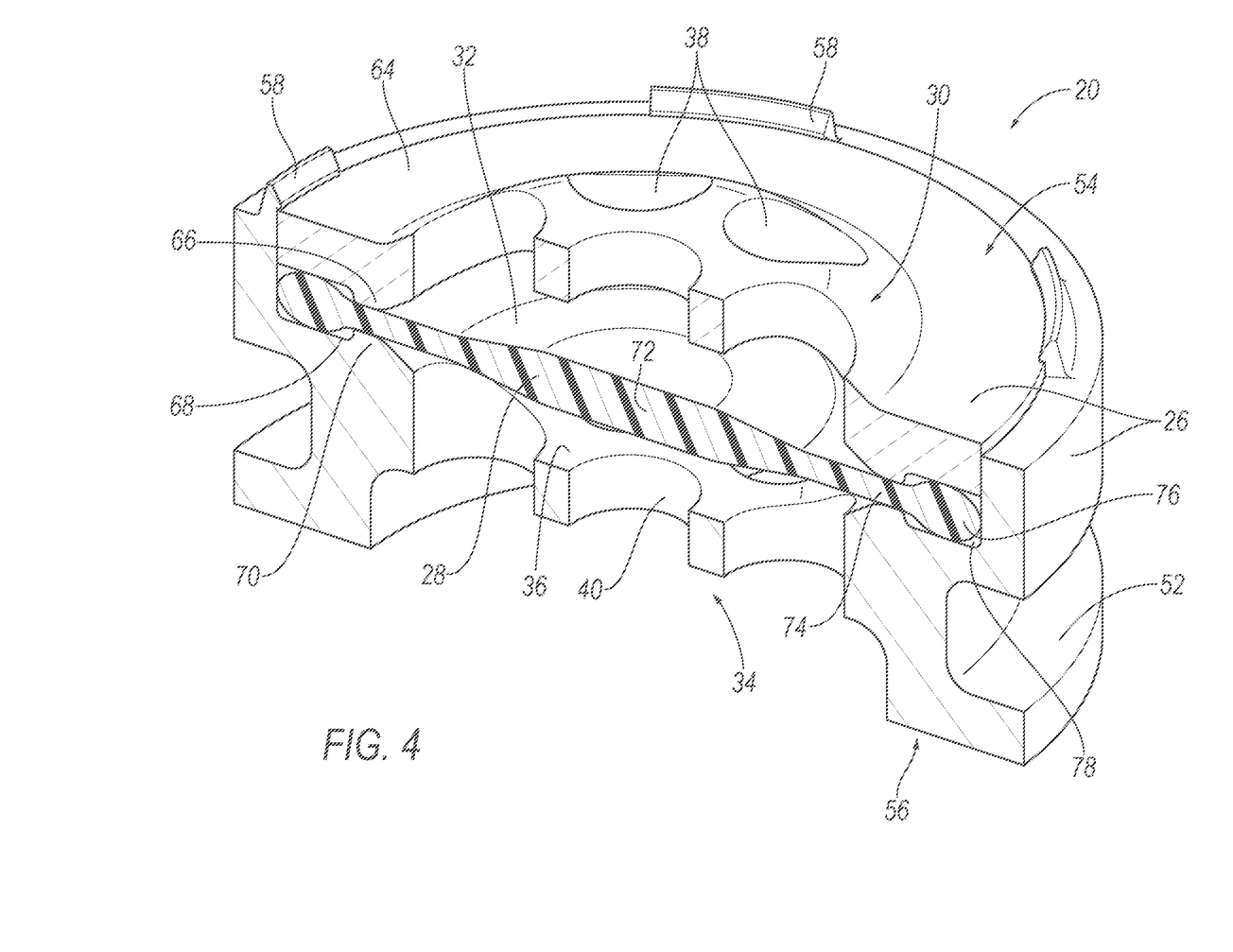
FIG. 4 is a cross-section of the floating piston.
Figure 5:
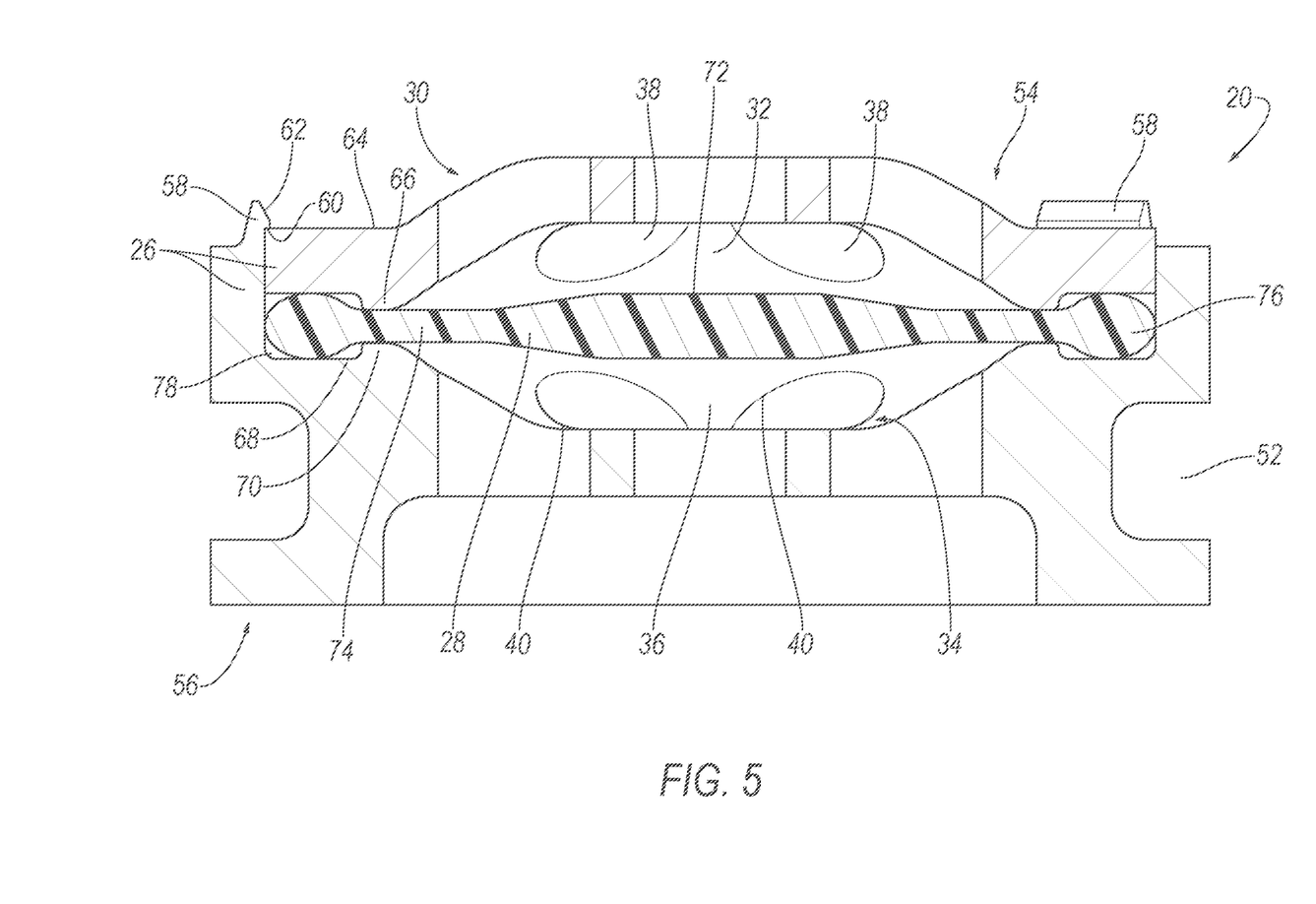
FIG. 5 is another cross-section of the floating piston.
Figure 6:
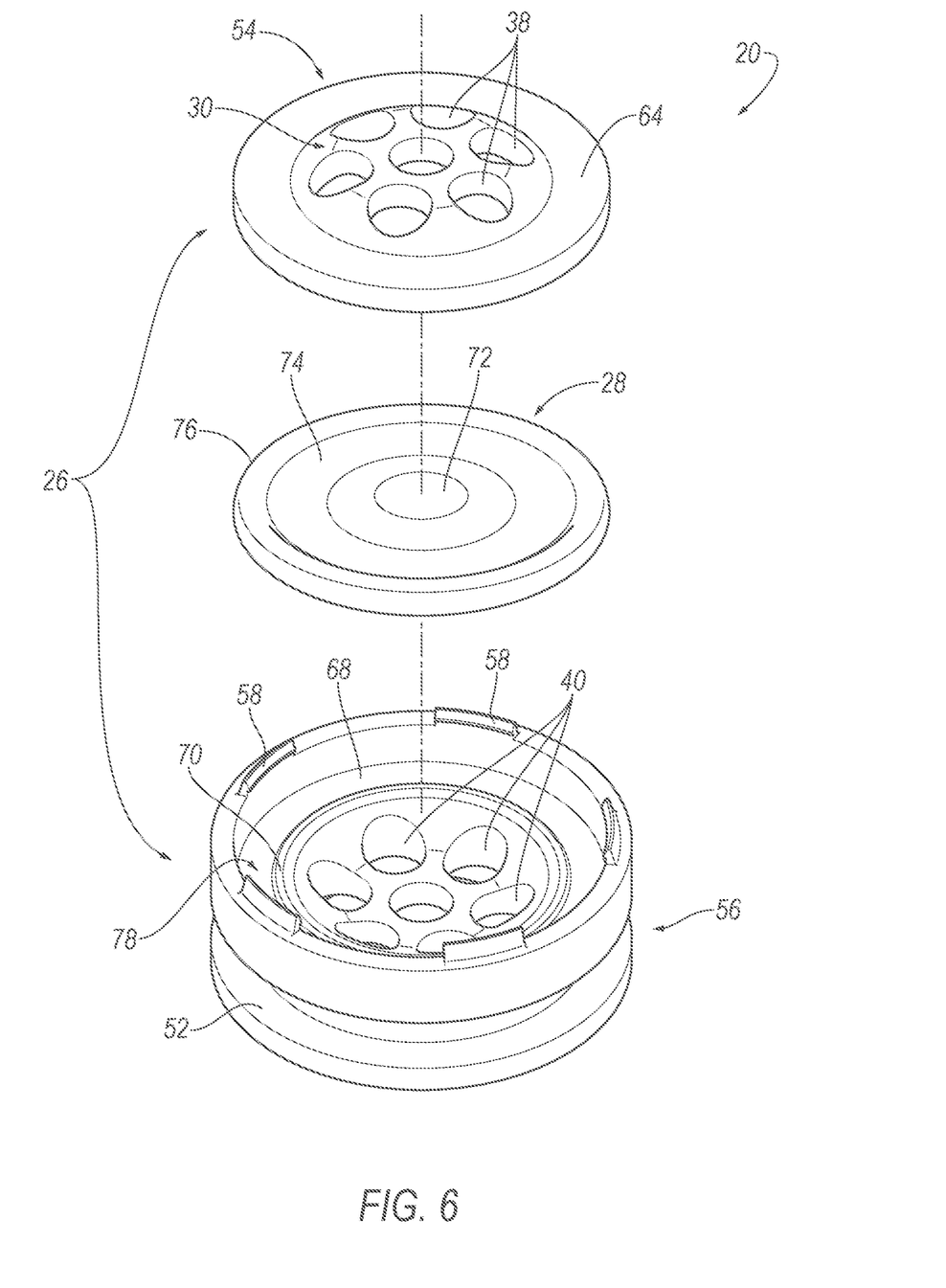
FIG. 6 is an exploded view of the floating piston.

The upper segment 54 may include a flange 64, a fulcrum 66, and an upper cage 30. The lower segment 56 may include a flange 68, a fulcrum 70, and a lower cage 34. With reference to FIGS. 4 and 5, the fulcrum 66 of the upper segment 54 is between the flange 64 of the upper segment 54 and the upper cage 30. The fulcrum 70 of the lower segment 56 is between the flange 68 of the lower segment 56 and the lower cage 34. The fulcrum 66, 70 may be continuous around the central axis of the housing 26, i.e., may be ring shaped.

The upper segment 54 and the lower segment 56 are designed to retain the membrane 28 therebetween. For example, the membrane 28 includes a center portion 72, a ring portion 74 extending annularly around the center portion 72, and a bead 76 extending annularly around the ring portion 74, and the upper segment 54 and the lower segment 56 are designed to engage the bead 76. In such an example, the flanges 54, 58 of the upper segment 54 and the lower segment 56 define a channel 78 therebetween. The channel 78 may be continuous about the central axis of the housing 26 and may be annular about the fulcrum 66, 70. The channel 78 engages the bead 76 of the membrane 28. The fulcrum 66, 70 of the upper segment 54 and the lower segment 56 retain the bead 76 in the channel 78. Specifically, the fulcrum 66, 70 oppose each other. The fulcrum 66, 70 are closer to each other than the flanges 54, 58 to form a restriction that retains the bead 76 in the channel 78. The fulcrum 66, 70 may contact the ring portion 74 of the membrane 28. The fulcrum 66, 70 may be shaped, e.g., with a rounded end, to reduce wear on the membrane 28 due to flexing of the membrane 28 against the fulcrum 66, 70.

The upper cage 30 retains the membrane 28 in the housing 26 and provides fluid communication between the working chamber 22 and the membrane 28. The lower cage 34 retains the membrane 28 in the housing 26 and provides fluid communication between the gas chamber 24 and the membrane 28. Specifically, the upper cage 30 defines an upper chamber 32 and a lower cage 34 is spaced from the upper cage 30 and defines a lower chamber 36. The upper chamber 32 in fluid communication with the working chamber 22 and the lower chamber 36 is in fluid communication with the gas chamber 24. For example, the upper cage 30 has at least one passageway 38 extending from the upper chamber 32 to the working chamber 22 (i.e., providing fluid communication therebetween) and lower cage 34 has at least one passageway 40 extending from the lower chamber 36 to the gas chamber 24 (i.e., providing fluid communication therebetween). The passageways 38, 40 are sized to allow suitable fluid flow therethrough yet small enough to prevent the membrane 28 from stretching through the passageways 38, 40 under pressure.

The membrane 28 fluidly separates the upper chamber 32 and the lower chamber 36. Specifically, the membrane 28 prevents communication of fluid from the upper chamber 32 to the lower chamber 36 and prevents communication of gas from the lower chamber 36 to the upper chamber 32.

The upper cage 30 and the lower cage 34 are designed to limit the travel of the membrane 28 as the membrane 28 flexes to prevent damage to the membrane 28, e.g., by avoiding plastic deformation of the membrane 28. The upper cage 30 and the lower cage 34 may be dome-shaped. The fulcrum 66 of the upper segment 54 extends annularly around the dome shape of the upper cage 30 and the fulcrum 70 of the lower segment extends annularly around the dome shape of the lower cage 34. The dome shape of the upper cage 30 and the lower cage 34 and the size and spacing of the passageways 38, 40 are designed to support the membrane 28 under pressure and to prevent the membrane 28 from plastically deforming when flexed.

The membrane 28 is flexible relative to the housing 26. As set forth above, the membrane 28 includes the center portion 72, the ring portion 74 extending annularly around the center portion 72, and the bead 76 extending annularly around the ring portion 74. The ring portion 74 is thinner along the axis of the housing 26 than the center portion 72 and the bead 76. The ring portion 74 allows the membrane 28 to flex toward the upper cage 30 and the lower cage 34 in response to pressure differences between the working chamber 22 and the gas chamber 24. The center portion 72 may have a middle and a tapering portion 74 extending annularly about the middle and tapering from the middle to the to the ring portion 74.

The center portion 72 moves toward the lower cage 34 in response to higher pressure in the working chamber 22 than the gas chamber 24, i.e., during movement of the piston 16 in the compression direction C. The center portion 72 moves toward the upper cage 30 in response to higher pressure in the gas chamber 24 than the working chamber 22, i.e., during movement of the piston 16 in the rebound direction R.

The center portion 72 may contact the upper cage 30 in response to higher pressure in the working chamber 22 than the gas chamber 24 and the center portion 72 may contact the lower cage 34 in response to higher pressure in the gas chamber 24 than the working chamber 22. In such an example, the center portion 72 is aligned with the passageways 38, 40 in the upper cage 30 and the lower cage 34 such that the center portion 72 abuts the upper cage 30 and the lower cage 34 at the passageways 38, 40. The center portion 72 is thicker along the central axis of the housing 26 relative to the ring portion 74 to prevent extension of the center portion 72 through the passageways 38, 40 in such positions. Specifically, the center portion 72 and the passageways 38, 40 are sized to withstand the relative pressure differences and prevent the center portion 72 from extending through the passageway 38, 40 during movement of the piston 16 in the compression direction C and the rebound direction R.

The center portion 72, ring portion 74, and bead 76 may be unitary, i.e., a single, uniform piece of material with no seams, joints, fasteners, or adhesives holding it together; specifically, formed together simultaneously as a single continuous unit, e.g., by molding. Non-unitary components, in contrast, are formed separately and subsequently assembled, e.g., by adhesive, welding, etc. The membrane 28 may be plasticized rubber or any other suitable polymer including elastomeric polymers, elastically-deformable plastic, elastically-deformable rubber, etc.

The housing 26 and the membrane 28 may be tuned so that the membrane 28 flexes and the housing 26 moves relative to the tube 14 at desired pressure differences between the working chamber 22 and the gas chamber 24. For example, the tuning may include the relative thickness of the ring portion 74 and the center portion 72; the diameter of the center portion 72; the material selection of the membrane 28 for flexibility; the shape, size, and position of the fulcrum 66, 70; and the number and size of passageways 38, 40 in the upper cage 30 and/or the lower cage 34.

In operation, the membrane 28 is spaced from the upper cage 30 and the lower cage 34 when the piston 16 is at a rest position along the axis A. The membrane 28 moves toward the lower cage 34 when the piston 16 moves relative to the tube 14 along the axis A in a compression direction C toward the floating piston 20. For example, the membrane 28 may contact the lower cage 34 when the piston 16 is moved relative to the tube 14 along the axis A in the compression direction C toward the floating piston 20 from the rest position toward a compressed position. Likewise, the membrane 28 moves toward the upper cage 30 when the piston 16 moves relative to the tube 14 along the axis A in a rebound direction R away from the floating piston 20. For example, the membrane 28 may contact the upper cage 30 when the piston 16 is moved relative to the tube 14 along the axis A in a rebound direction R.

For relatively small suspension impulses, i.e., small-amplitude displacement of the rod 18 along the axis A, increase in pressure in the working chamber 22 is sufficient to flex the membrane 28 toward the gas chamber 24 and insufficient to move the floating piston 20 toward the gas chamber 24. Specifically, the increase in pressure in the working chamber 22 forces fluid in the working chamber 22 to pressurize the upper chamber 32, which urges the membrane 28 toward the lower cage 34. In such an example, the pressure difference between the working chamber 22 and the gas chamber 24 is insufficient to move the floating piston 20 toward the gas chamber 24. The pressure difference between the working chamber 22 and the gas chamber 24 is insufficient to move the floating piston 20 into the gas chamber 24 to compress the gas chamber 24. In such an operation, the membrane 28 dampens relatively small suspension impulses without movement of the floating piston 20 along the axis A, which eliminate friction from the floating piston 20.

For relatively larger impulses, the increase in pressure in the working chamber 22 flexes the membrane 28 and then moves the floating piston 20 toward the gas chamber 24. Specifically, the pressure difference between the working chamber 22 and the gas chamber 24 is sufficient to move the floating piston 20 into the gas chamber 24 to compress the gas chamber 24. The housing 26 and the membrane 28 deliver the force resulting from the pressure difference to compress the gas chamber 24. In such an example, the initial flex of the membrane 28 before movement of the housing 26 along the axis A rounds out the friction peak force from the floating piston 20. In other words, the flex of the membrane 28 eases the increased pressure in the working chamber 22 into motion of the floating piston 20 against the counteracting gas chamber 24.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle suspension damper comprising:
   a tube elongated along an axis;
   a piston disposed in the tube and moveable relative to the tube along the axis;
   a rod connected to the piston;
   a floating piston spaced from the piston along the axis and moveable relative to the tube along the axis;
   the tube defining a working chamber between the piston and the floating piston;
   the tube defining a gas chamber, the floating piston separating the gas chamber from the working chamber;
   the floating piston having an upper segment with an upper cage, the upper cage defining an upper chamber, the upper cage having a passageway extending from the upper chamber to the working chamber;
   the floating piston having a lower segment with a lower cage, the lower cage spaced from the upper cage, the lower cage defining a lower chamber, the lower cage having a passageway extending from the lower chamber to the gas chamber; and
   one of the upper segment and the lower segment including retention fingers that engage the other of the upper segment and the lower segment;
   the floating piston having a membrane fluidly separating the upper chamber and the lower chamber, the membrane being flexible relative to the upper segment and the lower segment.

2. The vehicle suspension damper of claim 1, wherein the membrane includes a center portion and a ring portion extending around the center portion, the center portion spaced from the upper cage and the lower cage when the piston is at a rest position along the axis.

3. The vehicle suspension damper of claim 1, wherein the membrane moves toward the lower cage when the piston moves relative to the tube along the axis in a compression direction toward the floating piston.

4. The vehicle suspension damper of claim 3, wherein the membrane moves toward the upper cage when the piston moves relative to the tube along the axis in a rebound direction away from the floating piston.

5. The vehicle suspension damper of claim 1, wherein the membrane includes a center portion and a ring portion extending around the center portion, the center portion being thicker than the ring portion along the axis.

6. The vehicle suspension damper of claim 5, wherein the membrane includes a bead extending annularly around the ring portion and engaging the housing.

7. The vehicle suspension damper of claim 5, wherein the upper segment and the lower segment have opposing fulcrum rings that abut the ring portion of the membrane.

8. The vehicle suspension damper of claim 1, further comprising oil in the working chamber.

9. A vehicle suspension damper comprising:
a tube elongated along an axis;
a piston disposed in the tube and moveable relative to the tube along the axis;
a rod connected to the piston;
a floating piston spaced from the piston along the axis and moveable relative to the tube along the axis;
the tube defining a working chamber between the piston and the floating piston;
the tube defining a gas chamber, the floating piston separating the gas chamber from the working chamber;
the floating piston having a housing slideably engaged with the tube, the housing having an upper cage defining an upper chamber in fluid communication with the working chamber, the housing having a lower cage spaced from the upper cage, the lower cage defining a lower chamber in fluid communication with the gas chamber, and the housing including an upper segment having the upper cage and a lower segment having the lower cage, one of the upper segment and the lower segment including retention fingers that engage the other of the upper segment and the lower segment; and
the floating piston having a membrane fluidly separating the working chamber from the gas chamber, the membrane being flexible relative to the housing and fluidly separating the upper chamber and the lower chamber.

10. The vehicle suspension damper of claim 9, wherein the membrane includes a center portion and a ring portion extending around the center portion, the center portion being thicker than the ring portion along the axis.

11. The vehicle suspension damper of claim 10, wherein the membrane includes a bead extending annularly around the ring portion and engaging the housing.

12. The vehicle suspension damper of claim 10, wherein the housing includes an upper segment and a lower segment, the upper segment and the lower segment having opposing fulcrum rings that abut the ring portion of the membrane.

13. The vehicle suspension damper of claim 9, wherein the membrane moves toward the lower cage when the piston moves relative to the tube along the axis in a compression direction toward the floating piston.

14. The vehicle suspension damper of claim 13, wherein the membrane moves toward the upper cage when the piston moves relative to the tube along the axis in a rebound direction away from the floating piston.

15. The vehicle suspension damper of claim 9, wherein the upper cage defines a passageway from the upper chamber to the working chamber and the lower cage defines a passageway from the lower chamber to the gas chamber.

16. The vehicle suspension damper of claim 9, wherein the membrane is spaced from the upper cage and the lower cage when the piston is at a rest position along the axis.

17. The vehicle suspension damper of claim 9, further comprising oil in the working chamber.

* * * * *